(12) United States Patent
Amann et al.

(10) Patent No.: US 8,709,242 B2
(45) Date of Patent: Apr. 29, 2014

(54) WATER-CONDUCTING HOUSEHOLD APPLIANCE, IN PARTICULAR A DISHWASHER

(75) Inventors: Claus Amann, Giengen (DE); Johannes Büsing, Emersacker (DE); Javier Garcia Purroy, Navarra (ES); Manfred Seeβle, Gerstetten (DE); Wilhelm Thibaut, Sontheim (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 496 days.

(21) Appl. No.: 13/188,483

(22) Filed: Jul. 22, 2011

(65) Prior Publication Data

US 2012/0024768 A1 Feb. 2, 2012

(30) Foreign Application Priority Data

Jul. 28, 2010 (DE) .......................... 10 2010 038 584

(51) Int. Cl.
 *B32B 3/12* (2006.01)
 *C25F 1/00* (2006.01)
(52) U.S. Cl.
 USPC ...... 210/167.01; 210/297; 210/300; 210/315; 210/498; 210/499; 428/116; 428/118; 134/104.1
(58) Field of Classification Search
 USPC .................. 210/297, 300, 315, 498, 499; 134/104.1; 428/116, 118; 241/46.012
 See application file for complete search history.

(56) References Cited

U.S. PATENT DOCUMENTS

| | | | | |
|---|---|---|---|---|
| 3,334,750 A | * | 8/1967 | Ullman, Jr. | 210/239 |
| 3,434,671 A | * | 3/1969 | Cushing et al. | 241/46.012 |
| 3,981,456 A | * | 9/1976 | Hahn et al. | 241/46.012 |
| 4,201,345 A | * | 5/1980 | Ziegler | 241/46.012 |

FOREIGN PATENT DOCUMENTS

EP  1340448 B1  6/2010

* cited by examiner

*Primary Examiner* — Krishnan S Menon
*Assistant Examiner* — Allison Fitzsimmons
(74) *Attorney, Agent, or Firm* — James E. Howard; Andre Pallapies

(57) ABSTRACT

A water-conducting household appliance, in particular a dishwasher, includes a hydraulic circuit for circulation of a wash fluid, and a filter facility which includes a filter element having an inner wall and at least one filter opening for passage of the wash fluid. The filter opening is bounded by the inner wall running around the filter opening. The inner wall has an upstream wall segment and a downstream wall segment, with a gradation being formed at least in a segment between an upstream and downstream wall segment of the inner wall of the filter opening. Additionally or independently hereof, the downstream wall segment has a cross section that increases in a flow direction of the wash fluid.

24 Claims, 4 Drawing Sheets

WATER-CONDUCTING HOUSEHOLD APPLIANCE, IN PARTICULAR A DISHWASHER

BACKGROUND OF THE INVENTION

The invention relates to a water-conducting household appliance, in particular a dishwasher, having a hydraulic circuit, in which wash fluid can be circulated, and a filter facility, which features a filter element having at least one filter opening for the passage of wash fluid, the filter opening being bounded by an inner wall running around the filter opening.

DE 102 08 992 B4 for example discloses a dishwasher, which features a filter combination for filtering off food residues present in the circulated wash fluid. The filter combination features a coarse filter for filtering off larger dirt particles and a fine filter for filtering off dirt particles that are finely dispersed in the wash fluid. The fine filter of the filter combination is a perforated, flat component, which covers a pump sump in the base off from the wash compartment of a wash container. The fine filter, which is configured with a plurality of screen holes, encloses the hollow-cylindrical coarse filter. The filter surface of the flat fine filter here is curved so that it slopes towards the coarse filter in the manner of a funnel. The filter performance and flow resistance of the fine filter are a function inter alia of the number of screen holes provided in the fine filter.

BRIEF SUMMARY OF THE INVENTION

It is an object of the invention to provide a water-conducting household appliance, in particular a dishwasher, the filter combination of which can be produced more easily.

According to the characterising portion of claim 1 a gradation is formed at least in a segment between an upstream and downstream wall segment of the inner wall of the filter opening. The gradation, which runs around the filter opening, separates the upstream wall segment from the downstream wall segment. Additionally or independently hereof the downstream wall segment features a cross section that increases in the flow direction of the wash fluid.

Such a contour profile with gradation and/or widening cross section of the inner wall is advantageous, particularly when producing the filter element using a plastic injection moulding procedure. In this instance an injection moulding chamber can be formed by opposing moulding tools. The injection moulding chamber forms a negative mould for the filter element to be moulded. When the injection moulding chamber is closed the contact surfaces of the moulding tools are in contact with one another. The contact surfaces of the moulding tools then lie in a demoulding plane. This demoulding can preferably be provided between the upstream and downstream opening edges of the filter opening, but not directly on the upper filter surface or the bottom of the filter element. This allows flow-favouring roundings to be provided in the flow direction both in the inlet region and the outlet region of the filter, while sharp-cornered transitions produced by moulding tools are disposed in the interior of the filter, in other words in the region of the demoulding plane.

If the downstream wall segment of the respective filter opening or respective screen hole features a cross section that increases in the flow direction, the discharge of wash fluid from the upper filter surface through the plurality of screen holes down to the bottom of the filter element can also be improved.

A peripheral undercut is preferably formed in the inner wall in the flow direction of the wash fluid, its annular surface facing the downstream opening edge. The cross section of the filter opening therefore widens in the flow direction, thereby reducing flow resistance.

The two moulding tools can be brought into contact with one another with an offset due to tolerances, in particular with a mould offset in the demoulding plane. This mould offset means that during moulding an upper half and lower half of the plastic part result, which are offset from one another by the mould offset. The resulting offset corners increase the flow resistance of the filter element.

To prevent such formation of offset corners, the abovementioned annular surface of the gradation can lie directly in the demoulding plane. The downstream wall segment here can be disposed with a lateral offset by a degree of offset in relation to the upstream wall segment. The degree of offset can therefore compensate for any mould offset of the moulding tools. A mould offset due to tolerances therefore does not cause sharp offset corners to be formed, which project into the flow of fluid. With this in mind it may be expedient for the degree of offset of the annular surface to be greater than or at least equal to the mould offset between the moulding tools due to tolerances.

The at least one filter opening can preferably be configured as a hexagonal hole. The hexagonal holes provided instead of round holes can—compared with a round hole—be disposed with much greater density in the filter element for the same available filter surface, without having to reduce the material thickness of the webs running between the hexagonal holes. With the same material thickness between the adjacent hexagonal holes it is therefore possible to achieve an increase of more than 10% in the flow passage compared with the round holes. The web thickness required for the stability of the component does not have to be reduced in this process compared with the round holes.

For the densest possible arrangement of the hexagonal holes, these can expediently be disposed in a honeycomb in the filter element. The webs running between the hexagonal holes can therefore be configured with consistent material thickness, thereby increasing the inherent rigidity of the filter element.

In one advantageous embodiment the filter element can be a flat fine filter. It can in particular cover a sump or pump sum in the base of the wash container off from the dishwasher wash compartment above it, in the manner of a funnel-type component. A width across flats of the hexagonal holes can preferably be in the region of 1 mm, with the result that finely dispersed dirt particles can be filtered out of the wash fluid during dishwasher operation.

For simple production the filter element can be a plastic moulded part, in particular with a thickness in the region of 1 to 2 mm, through which the filter openings pass. The filter surface of the fine filter, which is in the manner of a funnel when installed, therefore forms a slope, along which at least some of the wash fluid can flow in a transverse flow to a hollow-cylindrical coarse filter, which is enclosed by the fine filter. The coarse filter can be inserted in an insertion opening of the fine filter. The funnel-type filter surface can extend between the insertion opening and an outer edge of the fine filter.

In one preferred embodiment the at least one filter opening can be rounded off or chamfered with a chamfer at its upstream and/or downstream opening edge. This prevents sharp corners at the opening edges of the filter opening, which would increase the flow resistance.

To reduce flow losses further, the inner wall of the filter opening can feature a constricted contour profile in a cross-sectional view, with the upstream wall segment of the inner wall tapering to the gradation. The flow cross section of the filter opening is smallest at the gradation. From the gradation the downstream wall segment of the inner wall can be widened in the direction of the downstream opening edge.

BRIEF DESCRIPTION OF THE DRAWINGS

The invention and its advantageous developments are described in more detail below with reference to schematic drawings, in which.

DETAILED DESCRIPTION OF EXEMPLARY EMBODIMENTS OF THE PRESENT INVENTION

Figure 1:
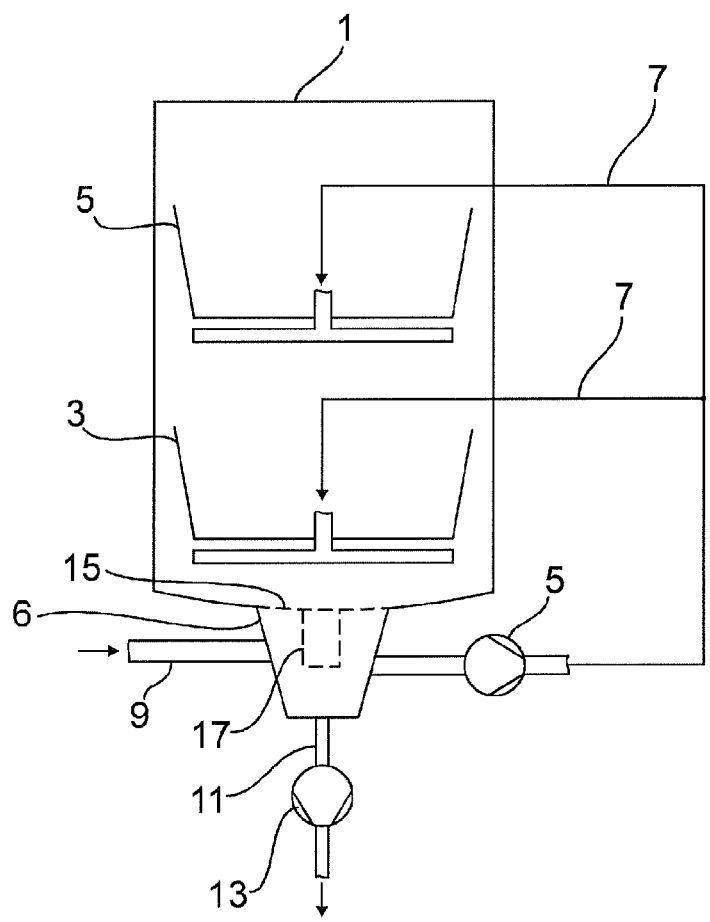
FIG. 1 shows a roughly schematic diagram of the wash container of a dishwasher, on the base of which a pump sump with filter combination is provided.

FIG. 1 shows a roughly schematic diagram of a dishwasher with a wash container 1, in which items to be washed (not shown) can be disposed in racks 3, 5. Provided in the region of the wash container base is a pump sump 6 with a downstream circulating pump 5, which is connected by way of fluid lines 7 for flow purposes to the spray arms. The pump sump 6 here is connected by way of example via connectors to a fresh water supply line 9 and a drain line 11, in which a drain pump 13 is disposed to pump away dirty wash fluid from the wash container 1.

As shown in FIG. 1, the top of the pump sump 6 is covered with a flat, funnel-type filter element 15. Inserted into the filter element 15 is a hollow-cylindrical, pot-type coarse filter 17. This retains particles which could block the drain pump 13. The filter element 15 in contrast operates as a fine filter, which filters smaller dirt particles out of the wash fluid. The filter element 15 together with the coarse filter 17 forms a two-part filter combination.

Figure 2:
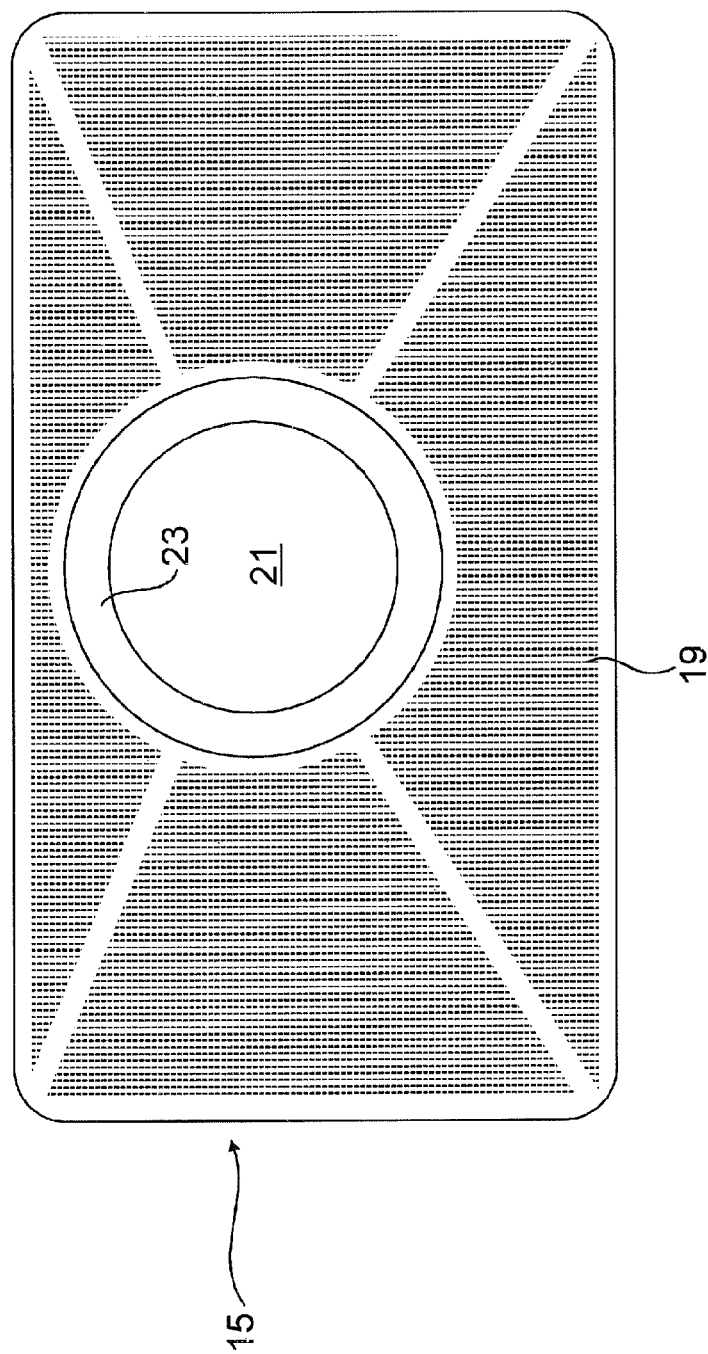
FIG. 2 shows an inventive filter element of the filter combination alone.

The filter element 15 is shown alone in FIG. 2. According to this the filter element 15 is configured with a perforation consisting of a plurality of filter openings 19. Provided within the flat filter element 15 is an insertion opening 21, which is bounded by an annular flange 23 of the filter element 15. When installed, the coarse filter 17 is inserted from above into the insertion opening 21 of the filter element 15. In this process the upper edge of the coarse filter 17 pushes against the annular flange 23 of the filter element 15, causing the latter's outer edge 25 in turn to be pushed against the inside of the wash container base.

Figure 3:
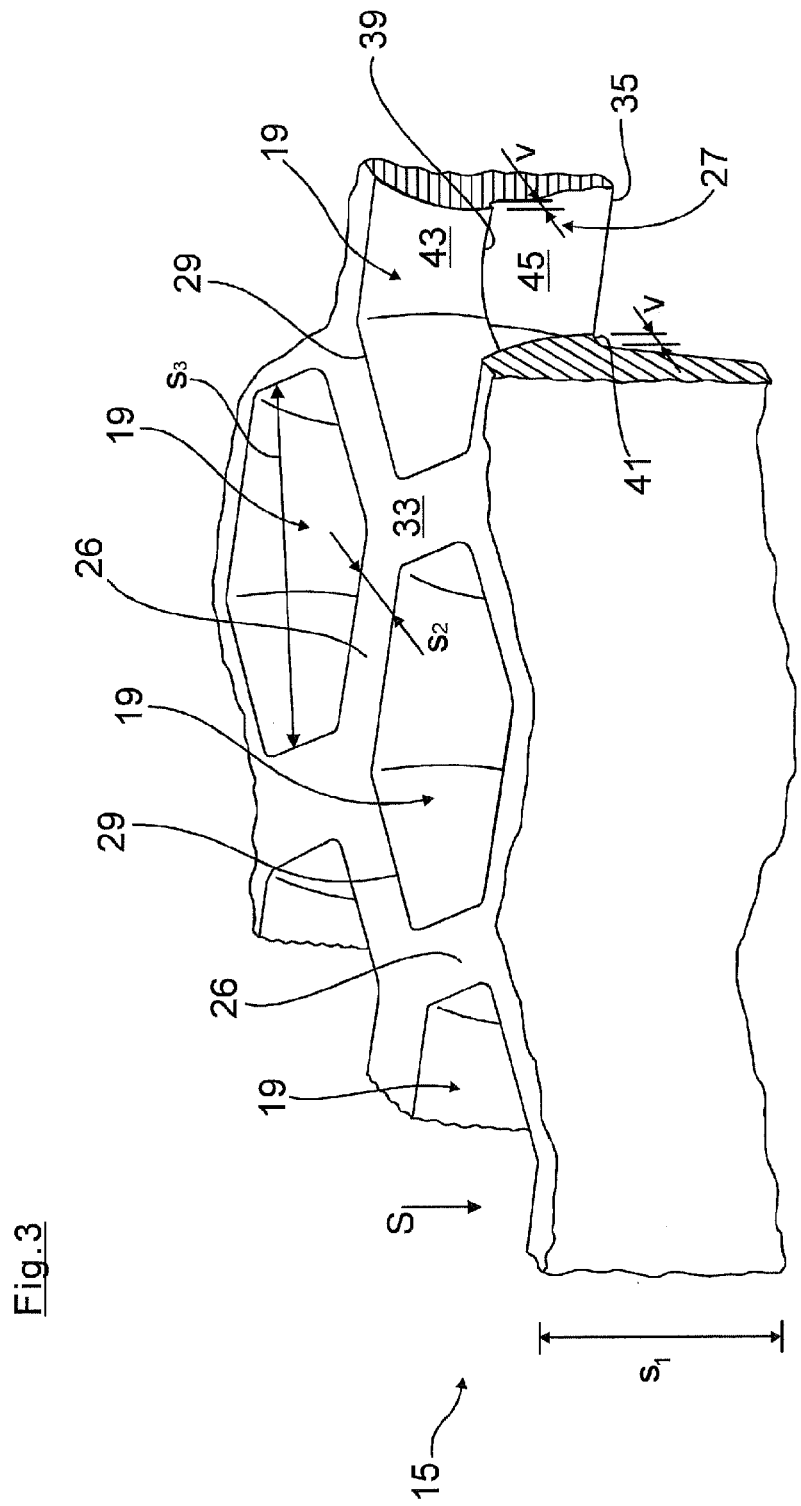
FIG. 3 shows a greatly enlarged perspective partial view of hexagonal holes of the filter element.

FIG. 3 shows a greatly enlarged section of the filter element 15. The filter element 15 is produced as a plastic injection moulded part. Its material thickness $s_1$ is preferably in the region of 1 to 2 mm. As also shown in FIG. 3, the filter openings 19 are configured as hexagonal holes in the present exemplary embodiment. Large numbers of these are disposed in a honeycomb in the filter element 15. The hexagonal holes are also separated from one another by way of peripheral webs 26, the material thickness $s_2$ of which is in particular in the region of 0.2 to 0.5 mm. The honeycomb arrangement of the hexagonal holes 19 is expediently selected so that the peripheral webs 26 can have consistent material thickness.

Figure 4:
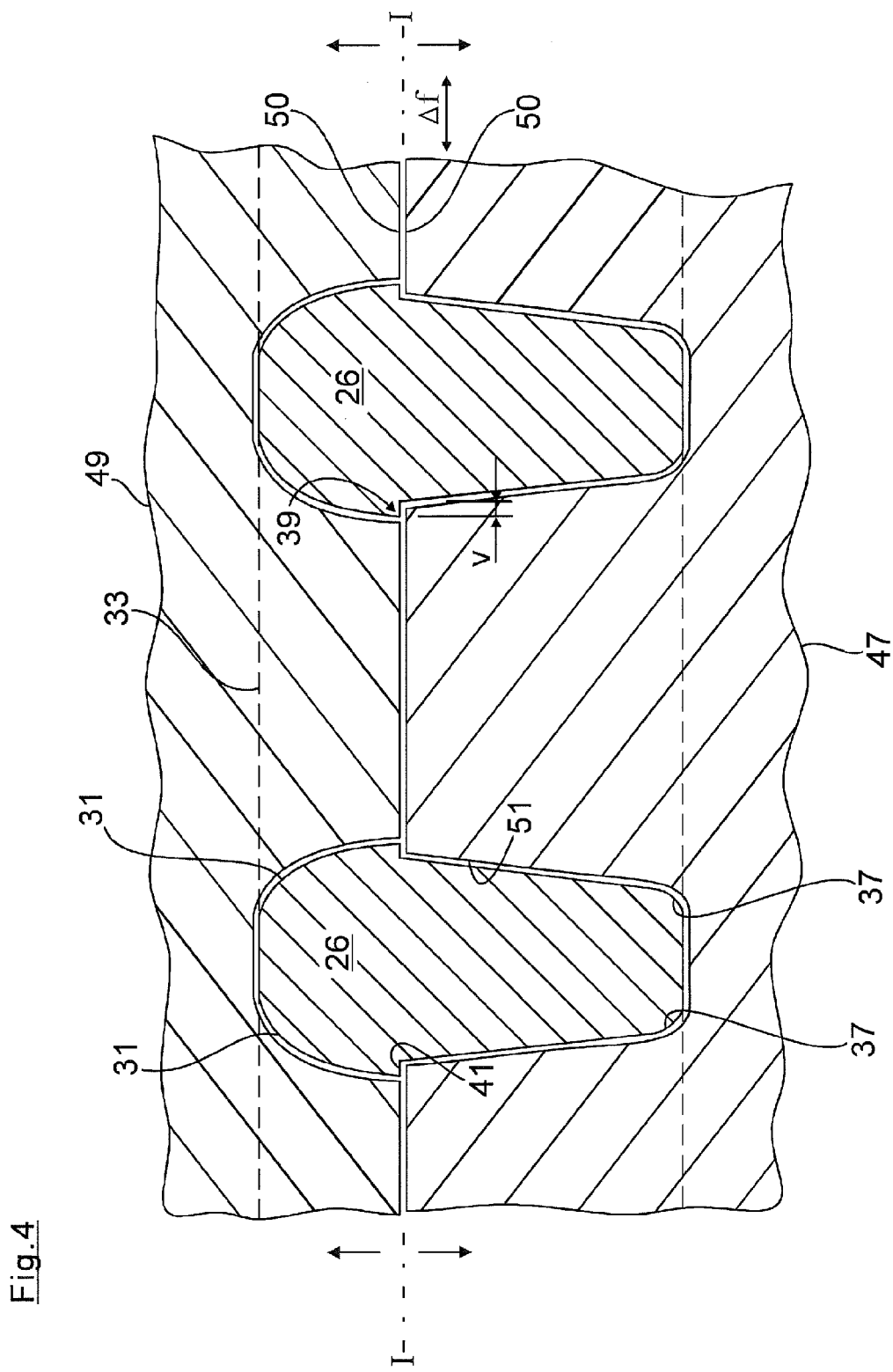
FIG. 4 shows a similarly greatly enlarged side sectional view of the contour profile of the inner wall of a hexagonal hole with associated moulding tools.

Described in the following with reference to FIGS. 3 and 4 is the contour profile of the inner wall 27, which bounds each of the hexagonal holes 19 at its periphery. Viewed in the flow direction S of the wash fluid, the upper filter surface 33 of the filter element 15 transitions at the upstream opening edge 29 with a chamfer 31, as shown in FIG. 4, into the inner wall 27. In the same manner a chamfer 37 is also configured at the downstream opening edge 35 of the hexagonal hole 19. This allows a generally homogeneous flow pattern to be generated as wash fluid passes through the hexagonal holes 19, thereby allowing flow resistance to be reduced.

As also shown in FIGS. 3 and 4, the contour profile of the inner wall 27 along the flow direction is not continuous but features a peripheral gradation 39 with an annular surface 41. This faces the downstream opening edge 35. The annular surface 41 (viewed from above) runs around the hexagonal opening of the respective screen hole. The gradation 39 divides the inner wall 27 into an upstream wall segment 43 and a downstream wall segment 45. The upstream wall segment 43 tapers to the gradation 39, so that the flow cross section of the hexagonal hole 19 is smallest there. The downstream wall segment widens from the gradation 39 in the direction of the downstream opening edge 35. As also shown in FIG. 4, the upper wall segment 43 projects over the lower wall segment 45 perpendicular to the flow direction S by a degree of offset v. Viewed in the flow direction S the gradation 41 therefore produces an undercut. The degree of offset v of the annular surface 41 is in particular around $5/100$ mm for a width across flats $s_3$ of the hexagonal hole 19 of preferably approx. 1 mm.

FIG. 4 also shows the upper and lower moulding tools 47, 49, which are brought into contact with one another. The moulding tools 47, 49 bound an injection moulding chamber 51, which forms a negative mould for the filter element 15. The contact surfaces 50 of the moulding tools 47, 49 lie in a demoulding plane I. The two moulding tools 47, 49 can be moved upwards and downwards away from one another from the demoulding plane I in the arrow directions shown to demould the formed filter element 15.

According to FIG. 4 the annular surface 41 of the gradation 39 lies with the two contact surfaces 50 of the moulding tools 47, 49 in the demoulding plane I. The demoulding plane I is therefore advantageously set back both from the upper filter surface 33 and from the bottom of the filter element 15.

By dividing the injection moulding apparatus into the upper and lower moulding tools 47, 49, unavoidable tolerances mean that the process produces a mould offset Δf, by which the moulding tools 47, 49 are displaced slightly towards one another in the demoulding plane I.

The mould offset Δf means that during moulding an upper half and a lower half of the filter element are formed, which are offset in a sideways direction from one another by the mould offset. Offset corners that may result from this would increase the flow resistance of the filter element 15. However according to the invention the annular surface 41 in the demoulding plane I can prevent the formation of such offset corners. To this end the degree of offset v of the annular surface 41 is dimensioned so that it is greater than a possible mould offset Δf.

What is claimed is:
1. A dishwasher, comprising:
a hydraulic circuit for circulation of a wash fluid, and
a filter facility including a filter element having at least one inner wall and at least one filter opening for passage of the wash fluid, said filter opening being bounded by the at least one inner wall running around the at least one filter opening, said at least one inner wall having an upstream wall segment and a downstream wall segment and being configured in at least one of two ways, a first way in which a gradation is formed at least in a segment between the upstream and downstream wall segments of the inner wall of the filter opening, a second way in which the downstream wall segment has a cross section that increases in a flow direction of the wash fluid, said filter element is a honeycomb fine filter and said at least one filter opening is a hexagonal hole.

2. The conducting household appliance of claim 1, wherein the gradation forms an undercut that runs at least partially around the at least one inner wall.

3. The conducting household appliance of claim 1, wherein the gradation forms an annular surface that faces a downstream opening edge and runs at least partially around the at least one inner wall.

4. The conducting household appliance of claim 1, wherein the upstream wall segment has a cross section that decreases in the flow direction of the wash fluid.

5. The conducting household appliance of claim 1, wherein the filter element is a plastic moulded part, which is moulded in a chamber formed between moulding tools.

6. The conducting household appliance of claim 5, wherein during moulding of the filter element the moulding tools are in contact in a demoulding plane, which runs in the region of the inner wall between upstream and downstream opening edges of the filter opening.

7. The conducting household appliance of claim 6, wherein the gradation provided between the upstream and downstream wall segments lies in the demoulding plane.

8. The conducting household appliance of claim 5, wherein the downstream wall segment of the inner wall is disposed offset by a degree of offset in relation to the upstream wall segment, the degree of offset being greater than or equal to a mould offset due to tolerances between the moulding tools.

9. The conducting household appliance of claim 1, further comprising a wash container having a wash container base and a pump sump arranged in a region of the wash container base, said filter element being configured as a flat, funnel-type fine filter, which covers the pump sump.

10. The conducting household appliance of claim 1, further comprising a coarse filter, said the filter element having an insertion opening for receiving the coarse filter.

11. The conducting household appliance of claim 1, wherein the coarse filter is hollow-cylindrical.

12. The conducting household appliance of claim 1, wherein the filter opening has upstream and downstream opening edges, at least one of the upstream and downstream opening edges of the filter opening being rounded off or chamfered with a chamfer.

13. A filter element for a dishwasher, said filter element comprising at least one inner wall and at least one filter opening for passage of a wash fluid, said at least one filter opening being bounded by said at least one inner wall running around the filter opening, said at least one inner wall having an upstream and downstream wall segment and being configured in at least one of two ways, a first way in which a gradation is formed at least in a segment between the upstream and downstream wall segments of the inner wall of the filter opening, a second way in which the downstream wall segment has a cross section that increases in a flow direction of the wash fluid, said filter element is a honeycomb fine filter and said at least one filter opening is a hexagonal hole.

14. The filter element of claim 13, wherein the gradation forms an undercut that runs at least partially around the at least one inner wall.

15. The filter element of claim 13, wherein the gradation forms an annular surface that faces a downstream opening edge and runs at least partially around the at least one inner wall.

16. The filter element of claim 13, wherein the upstream wall segment has a cross section that decreases in the flow direction of the wash fluid.

17. The filter element of claim 13, wherein the filter element is a plastic moulded part, which is moulded in a chamber formed between moulding tools.

18. The filter element of claim 17, wherein during moulding of the filter element the moulding tools are in contact in a demoulding plane, which runs in the region of the inner wall between upstream and downstream opening edges of the filter opening.

19. The filter element of claim 18, wherein the gradation provided between the upstream and downstream wall segments lies in the demoulding plane.

20. The filter element of claim 13, wherein the downstream wall segment of the inner wall is disposed offset by a degree of offset in relation to the upstream wall segment, the degree of offset being greater than or equal to a mould offset due to tolerances between the moulding tools.

21. The filter element of claim 13, wherein the filter element is configured as a flat, funnel-type fine filter, which covers a pump sump in a wash container base of the water-conducting household appliance.

22. The filter element of claim 13, further comprising a coarse filter, said filter element having an insertion opening for receiving the coarse filter.

23. The filter element of claim 22, wherein the coarse filter is hollow-cylindrical.

24. The filter element of claim 13, wherein the filter opening has upstream and downstream opening edges, at least one of the upstream and downstream opening edges of the filter opening being rounded off or chamfered with a chamfer.

* * * * *